(12) United States Patent
Su et al.

(10) Patent No.: US 6,974,940 B2
(45) Date of Patent: Dec. 13, 2005

(54) ANTI-GLARE REARVIEW MIRROR ASSEMBLY AND REFLECTANCE CONTROL METHOD OF SAME

(75) Inventors: Wen-Wei Su, Hsinchu (TW); Kuei-Hung Chen, Taipei (TW); Shun-Hsiang Hsiao, Miaoli (TW)

(73) Assignee: Exon Science Inc., Taoyuan (TW)

( * ) Notice: Subject to any disclaimer, the term of this patent is extended or adjusted under 35 U.S.C. 154(b) by 259 days.

(21) Appl. No.: 10/350,246

(22) Filed: Jan. 23, 2003

(65) Prior Publication Data

US 2004/0099786 A1 May 27, 2004

(30) Foreign Application Priority Data

Nov. 21, 2002 (TW) ........................................ 91133923 A

(51) Int. Cl.⁷ .................................................. G01J 1/36
(52) U.S. Cl. ....................... 250/204; 356/448; 359/265; 359/603
(58) Field of Search ..................... 250/201.1, 204–206, 250/216, 578.1; 356/448; 359/601–605, 265

(56) References Cited

U.S. PATENT DOCUMENTS

| | | | |
|---|---|---|---|
| 4,632,509 A | | 12/1986 | Ohmi et al. |
| 5,322,996 A | | 6/1994 | Black et al. |
| 5,469,296 A | * | 11/1995 | Ohno et al. ................. 359/603 |
| 5,550,677 A | | 8/1996 | Schofield et al. |
| 5,659,423 A | * | 8/1997 | Schierbeek et al. ......... 359/604 |
| 5,768,020 A | * | 6/1998 | Nagao ....................... 359/604 |
| 6,379,013 B1 | * | 4/2002 | Bechtel et al. .............. 359/604 |
| 6,447,124 B1 | * | 9/2002 | Fletcher et al. ............. 359/604 |
| 6,523,964 B2 | * | 2/2003 | Schofield et al. ........... 359/601 |
| 6,592,229 B2 | * | 7/2003 | Sato et al. .................. 359/608 |
| 2002/0057016 A1 | | 5/2002 | O'Farrell et al. |

FOREIGN PATENT DOCUMENTS

EP 0285724 10/1988

* cited by examiner

*Primary Examiner*—David Porta
*Assistant Examiner*—Davienne Monbleau
(74) *Attorney, Agent, or Firm*—Volpe and Koenig, P.C.

(57) ABSTRACT

An anti-glare rearview mirror assembly and a reflectance control method thereof are disclosed. The assembly includes an electrochromic rearview mirrors, two rearward light sensors, and a comparative controller. The sensors receiving a first rearward light from a first specified region and a second rearward light from a second specified region at the same time point, respectively, wherein the first and second specified regions partially overlap with each other. The intensities of the first and second rearview mirror light are compared to obtain a light difference. The reflectance of the anti-glare rearview mirror is adjusted according to the light difference.

29 Claims, 13 Drawing Sheets

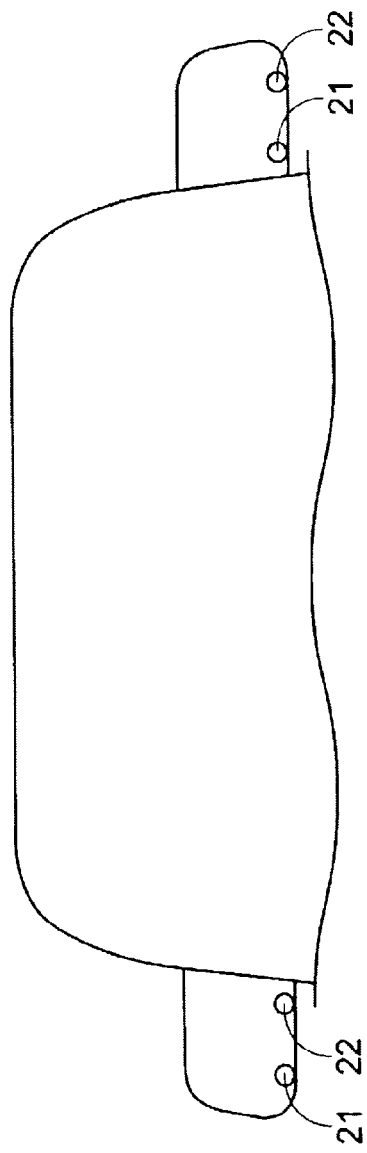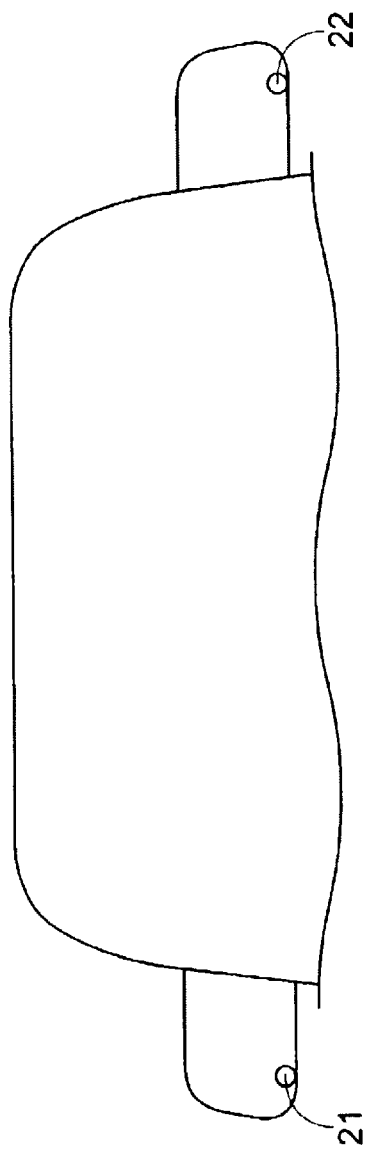

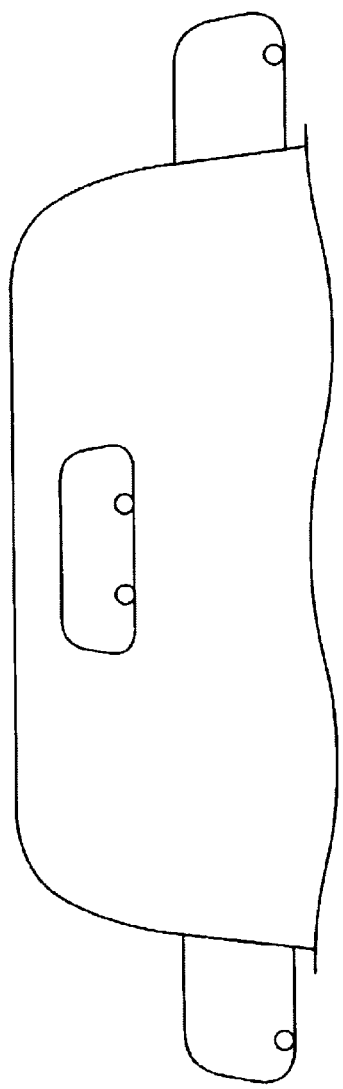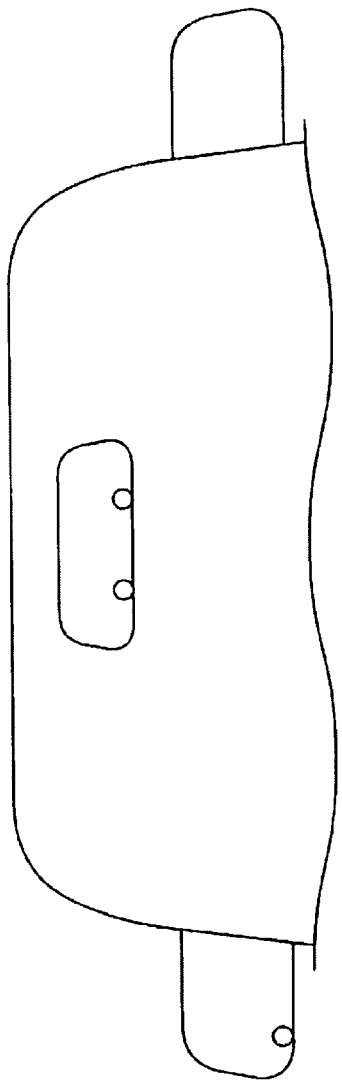

ANTI-GLARE REARVIEW MIRROR ASSEMBLY AND REFLECTANCE CONTROL METHOD OF SAME

FIELD OF THE INVENTION

The present invention relates to an anti-glare rearview mirror assembly, and more particular to an anti-glare rearview mirror assembly with a wide glare-detection range. The present invention also relates to a reflectance control method of an anti-glare rearview mirror assembly.

BACKGROUND OF THE INVENTION

Glare is one of the troublesome factors when driving a vehicle. Many efforts have been made to solve the glaring problem. One of the most effective ways is to provide an electrochromic unit for the rearview mirror of the vehicle. The electrochromic unit deepens the color and thus reduces the reflectance of the mirror according to the degree of the glare, thereby minimizing the glaring effect.

FIG. 1 is a schematic diagram showing a conventional anti-glare rearview mirror. A photo-detector 1 is mounted on an electrochromic rearview mirror 2, and oriented to detect rearward light. The photo-detector 1 outputs a control signal to the electrochromic rearview mirror 2 to adjust the reflectance of the mirror 2 according to the intensity of the rearward light. For example, for an intense rearward light, the reflectance of the mirror 2 is required to be lowered. That is, the color of the mirror 2 is deepened in order to avoid irritating to the driver's eyes.

The electrochromic unit receives a voltage from a voltage source which is the ignition or the vehicle battery voltage. The voltage is reduced to a level suitable for the electrochromic purpose, e.g. a voltage ranged between 0 and 3.5V. The higher the voltage level is applied to the electrochromic unit, the deeper the color of the mirror is, and the lower the reflectance of the mirror becomes. The reflectance is lowered from an uncolored initial level, e.g. 55% in general.

In this electrochromic mechanism, the rearward light is not necessarily glaring light. For example, in the sunny daytime, little glare effect is rendered and no reflectance adjustment is required. The electrochromic rearview mirror 2, however, is still frequently adjusted in response to the light detected by the photo-detector 1 according to this conventional anti-glare mechanism. As is known, the electrochromic unit of the mirror 2 has a certain life span, i.e. certain color-change cycles, the unnecessary reflectance variation will speed up the consumption of the electrochromic unit. Furthermore, since the photo-detector 1 is oriented to a certain direction and has a confined detection range α, the glare situation beyond the detection range α cannot be detected and solved.

FIG. 2A is a schematic block diagram showing another conventional electrochromic rearview mirror system. The rearview mirror system includes an interior rearview mirror assembly 11 inside the vehicle, two exterior rearview mirror assemblies 12 and 13 by two sides of the vehicle, respectively, and a control device 14. Each of the rearview mirror assemblies 11, 12 and 13 includes an electrochromic unit 111, 121, 131 which performs color change of the mirror under the control of the control device 14.

Further referring to FIG. 2B, the control device 14 includes a forward light sensor S1, a rearward light sensor S2, a voltage source 141, a micro-controller 142 and a drive circuit 143. The sensors S1 and S2 are disposed at the forward and rearward sides of the interior rearview mirror assembly 11 for detecting the intensities of the forward light and rearward light, respectively. First of all, the micro-controller 142 determines whether it is daytime or nighttime according to the forward light intensity detected by the sensor S1. For example, when the intensity of the forward light is detected to be greater than 50 Lux, it is determined to be daytime, and the micro-controller 142 disables the drive circuit 143. On the contrary, if the forward light is no greater than 50 Lux, the drive circuit 143 is enabled to adjust the reflectance of the mirrors according to the intensity of the rearward light in a manner as mentioned above. This conventional anti-glare mechanism, in spite of saving unnecessary operation cycles of the electrochromic units, may still waste many cycles under sufficient ambient illumination in the nighttime. Moreover, since the above-mentioned electrochromic mechanism does not work in daytime, the glaring effect resulting from intense sunrise or sunset sunlight cannot be avoided.

A further anti-glare mechanism was developed to solve the above problems by comparing the rearward light with ambient light. FIGS. 2 and 3 are referred to illustrate this mechanism. The micro-controller 142 determines whether a glaring situation occurs in response to the light intensity difference detected by the forward sensor S1 and the rearward sensor S2, and controls the drive circuit 143 to apply a suitable voltage to the electrochromic units 111, 121 and 131 to properly adjust the reflectance of the mirrors according to the intensity of the rearward light. This conventional electrochromic rearview mirror system, in spite of further reducing unnecessary operation cycles of the electrochromic units, still has the problem of the narrow detection range. In other words, the glare resulting from the right rear side or left rear side is possibly not detected, and still stimulates the driver's eyes.

SUMMARY OF THE INVENTION

Therefore, an object of the present invention is to provide an anti-glare rearview mirror assembly capable of minimizing unnecessary color-change cycles and having a wide detection range.

A first aspect of the present invention relates to a monitoring assembly for use in a vehicle. The assembly includes a monitor device such as an electrochromic rearview mirror or a liquid crystal display, changing the reflectance thereof in response to a control signal; a first light sensor disposed on a side of the electrochromic rearview mirror for receiving a first light from a first specified range, and outputting a first signal in response to the intensity of the first light; a second light sensor disposed on the same side of the electrochromic rearview mirror as the first light sensor for receiving a second light from a second specified range, and outputting a second signal in response to the intensity of the second light; and a comparative controller in communication with the first and the second light sensors, receiving and operating the first and the second signals to obtain a first result, and asserting the control signal to adjust the reflectance of the electrochromic rearview mirror according to the first result.

Preferably, the first and the second light sensors are both mounted on the electrochromic rearview mirror facing inside the vehicle.

In an embodiment, the comparative controller includes a comparator receiving and comparing the first and the second signals in an operation mode to obtain a light difference; and a base discriminating circuit in communication with the comparator, comparing the light difference with a first threshold value to obtain the first result.

Preferably, the comparator further compares the first signals at a first and a second time points, respectively, to obtain a first light variation, and compares the second signals at the first and second time points, respectively, to obtain a second light variation, and further compares the first signal and the second signal at the second time point on a condition that the first or the second light variation exceeds a second threshold value.

Preferably, the comparative controller further includes a balance device receiving and comparing the first and the second signals in an initial mode to obtain a photoelectric response error; and a multi-level driving circuit in communication with the base discriminating circuit and the balance device, differentially adjusting the reflectance of the electrochromic mirror according to the first result and the photoelectric response error.

Preferably, the multi-level driving circuit adjusts the reflectance of the electrochromic mirror when the light difference is substantially unequal to the photoelectric response error, and the first result indicates the light difference is greater than the first threshold value.

For example, the first and second light sensors are arranged on two corners of the electrochromic rearview mirror.

For example, the electrochromic rearview mirror is selected from an interior rearview mirror, an exterior rearview mirror, and a combined interior and exterior mirror set.

A second aspect of the present invention relates to an anti-glare rearview mirror assembly for use in a vehicle, which includes a first electrochromic rearview mirror changing the reflectance thereof in response to a first control signal; a second electrochromic rearview mirror changing the reflectance thereof in response to a second control signal; a first rearward light sensor disposed on the first electrochromic rearview mirror for receiving a first light, and outputting a first signal in response to the intensity of the first light; a second rearward light sensor disposed on the second electrochromic rearview mirror for receiving a second light, and outputting a second signal in response to the intensity of the second light; a comparative controller in communication with the first and the second light sensors, receiving and operating the first and the second signals to obtain a first result, and asserting either of the control signals to adjust the reflectance of the first and second electrochromic rearview mirrors according to the first result.

In an embodiment, the first and second electrochromic rearview mirrors are an interior and an exterior rearview mirrors changing colors thereof in response to the first and the control signals, respectively.

In another embodiment, the first and second electrochromic rearview mirrors are two exterior rearview mirrors changing colors thereof in response to the first and the second control signals, respectively.

A third aspect of the present invention relates to a reflectance control method of a monitor device such as an anti-glare rearview mirror assembly or a liquid crystal display. Taking the anti-glare rearview mirror as an example, the method comprises steps of receiving a first rearward light from a first specified region and a second rearward light from a second specified region at a first time point; comparing intensities of the first and second rearview mirror light to obtain a light difference therebetween; and adjusting the reflectance of the anti-glare rearview mirror according to the light difference.

Preferably, the method further comprises a step of comparing the light difference with a photoelectric response error, and disabling to adjust the reflectance of the anti-glare rearview mirror when the light difference is substantially equal to the photoelectric response error.

Preferably, the method further comprises a step of comparing the intensities of the first and second rearward lights with a threshold value, and disabling to adjust the reflectance of the anti-glare rearview mirror when both of the intensities of the first and second rearward lights are greater than the threshold value.

More preferably, the method further comprises steps of: receiving a third rearward light from the first specified region and a fourth rearward light from the second specified region at a second time point preceding the first time point; comparing intensities of the first and third light to obtain a first light variation; comparing intensities of the second and fourth light to obtain a second light variation; comparing the first and the second light variations with a first threshold value; and disabling to adjust the reflectance of the anti-glare rearview mirror when neither of the light variations exceeds the first threshold value.

Preferably, the step of adjusting the reflectance of the anti-glare rearview mirror is performed on a condition that the light difference exceeds a second threshold value.

A fourth aspect of the present invention relates to a reflectance control method of an anti-glare rearview mirror assembly. The anti-glare rearview mirror assembly includes a first, a second and a third rearview mirrors. The step includes steps of mounting a first, a second and a third light sensors on the first, the second and the third rearview mirrors, respectively; receiving a first rearward light, a second rearward light, and a third rearward light at a first time point; receiving a fourth rearward light, a fifth rearward light, and a sixth rearward light at a second time point following the first time point; comparing intensities of the first, the second and the third rearward lights with the fourth, the fifth and the sixth rearward lights to obtain a first, a second and a third light differences, respectively; comparing the first, the second and the third light differences with a threshold value; and adjusting the reflectance of any of the first, second and third rearview mirrors having the light difference thereof greater than the threshold value.

The step of adjusting reflectance is preferably performed according to levels of the light differences.

A fifth aspect of the present invention relates to a control module for automatically adjusting the reflectance of a monitor device such as a rearview mirror or a liquid crystal display. The control module comprises a comparative controller and is in communication with two rearward sensors and a vehicular digital bus such as a controller area network (CAN) bus or a vehicle area network (VAN) bus. The comparative controller receives and operates a first and a second signals outputted by the two rearward light sensors, respectively, to obtain a first result, and asserts a digital encoded control signal to the vehicular digital bus to adjust the reflectance of the monitor device according to the first result.

A sixth aspect of the present invention relates to a vehicular control system, which includes a vehicular digital bus; a first control module in communication with the vehicular digital bus and a first rearward light sensor for receiving a first signal from the first rearward light sensor and transmitting a first digital encoded signal associated with the first signal onto the vehicular digital bus; a second control module in communication with the vehicular digital bus and a second rearward light sensor for receiving a second signal from the second rearward light sensor and transmitting a second digital encoded signal associated with the second signal onto the vehicular digital bus; and a comparative controller receiving and operating the first and the second vehicular digital signals outputted by the first and the second rearward light sensors, respectively, to obtain a first result, and asserting a control signal to adjust the reflectance of a monitor device according to the first result.

The vehicular digital bus, for example, can be a controller area network (CAN) bus or a vehicle area network (VAN) bus, or any other suitable vehicular digital bus.

The control modules are in communication with said vehicular digital bus via either connecting cables or wireless transmission.

BRIEF DESCRIPTION OF THE DRAWINGS

The present invention may best be understood through the following description with reference to the accompanying drawings, in which:

FIGS. 6A~6D exemplify the arrangement of photosensors according to the present invention;

DETAILED DESCRIPTION OF THE PREFERRED EMBODIMENT

The present invention will now be described more specifically witch reference to the following embodiments. It is to be noted that the following descriptions of preferred embodiments of this invention are presented herein for purpose of illustration and description only; it is not intended to be exhaustive or to be limited to the precise form disclosed.

Figure 1:
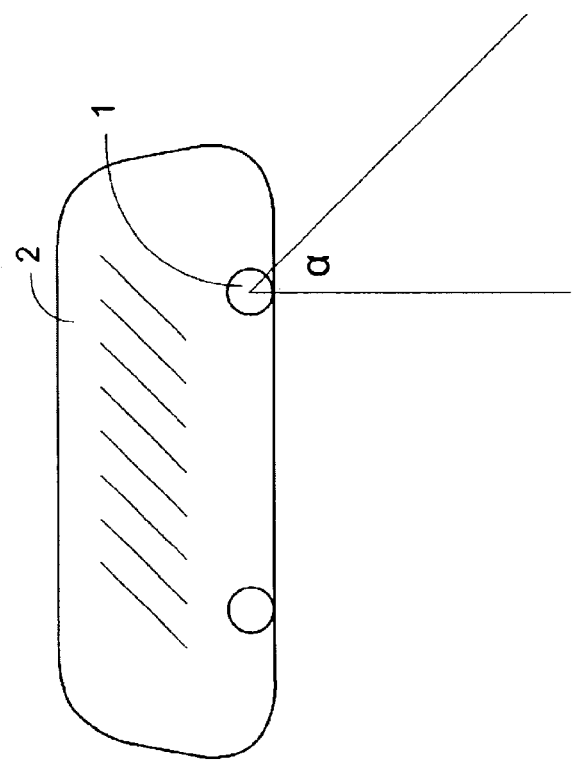
FIG. 1 is a schematic diagram showing a conventional electrochromic rearview mirror assembly.
Figure 2A:
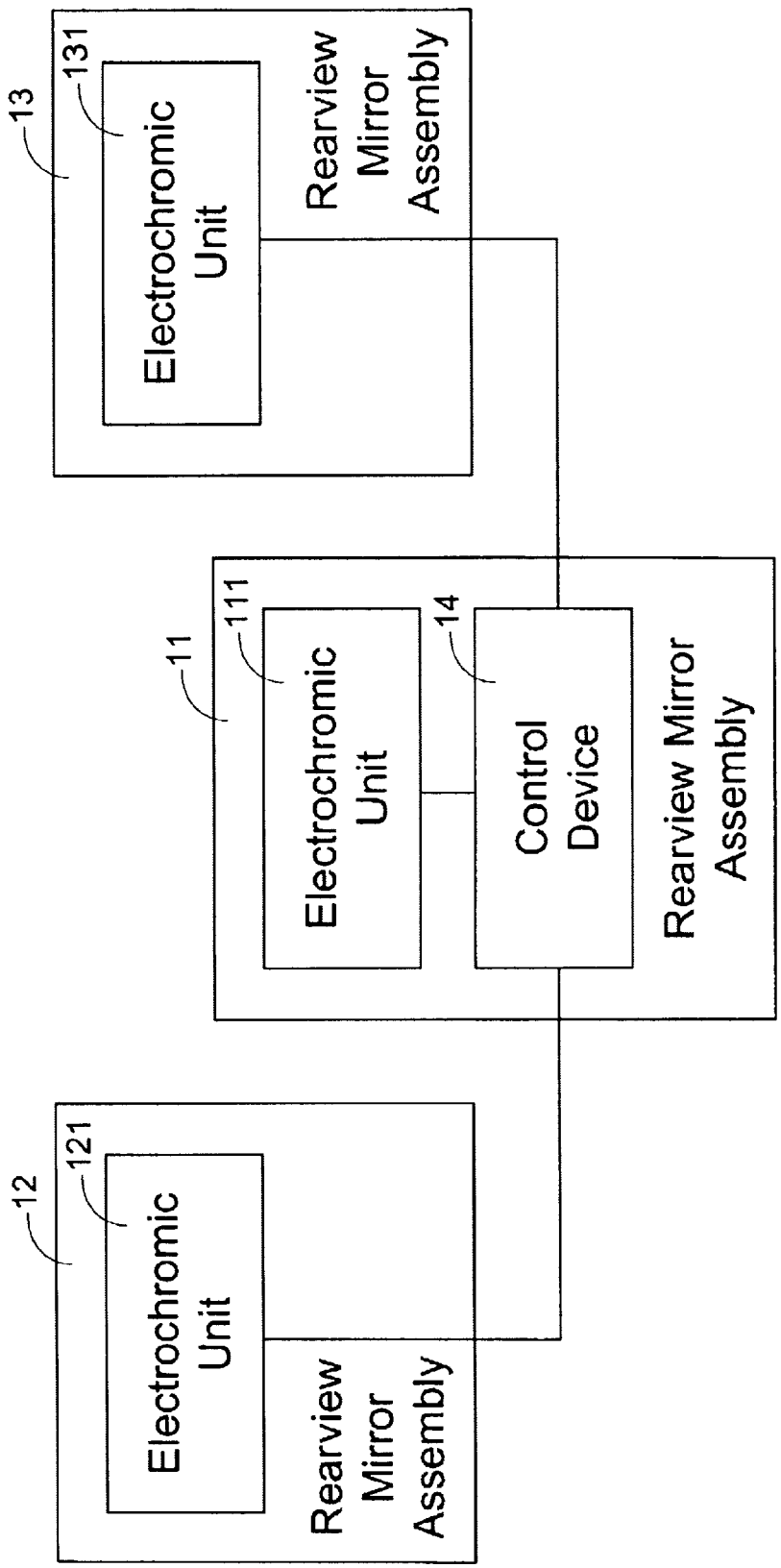
FIG. 2A is a schematic block diagram showing another conventional electrochromic rearview mirror assembly.
Figure 2B:
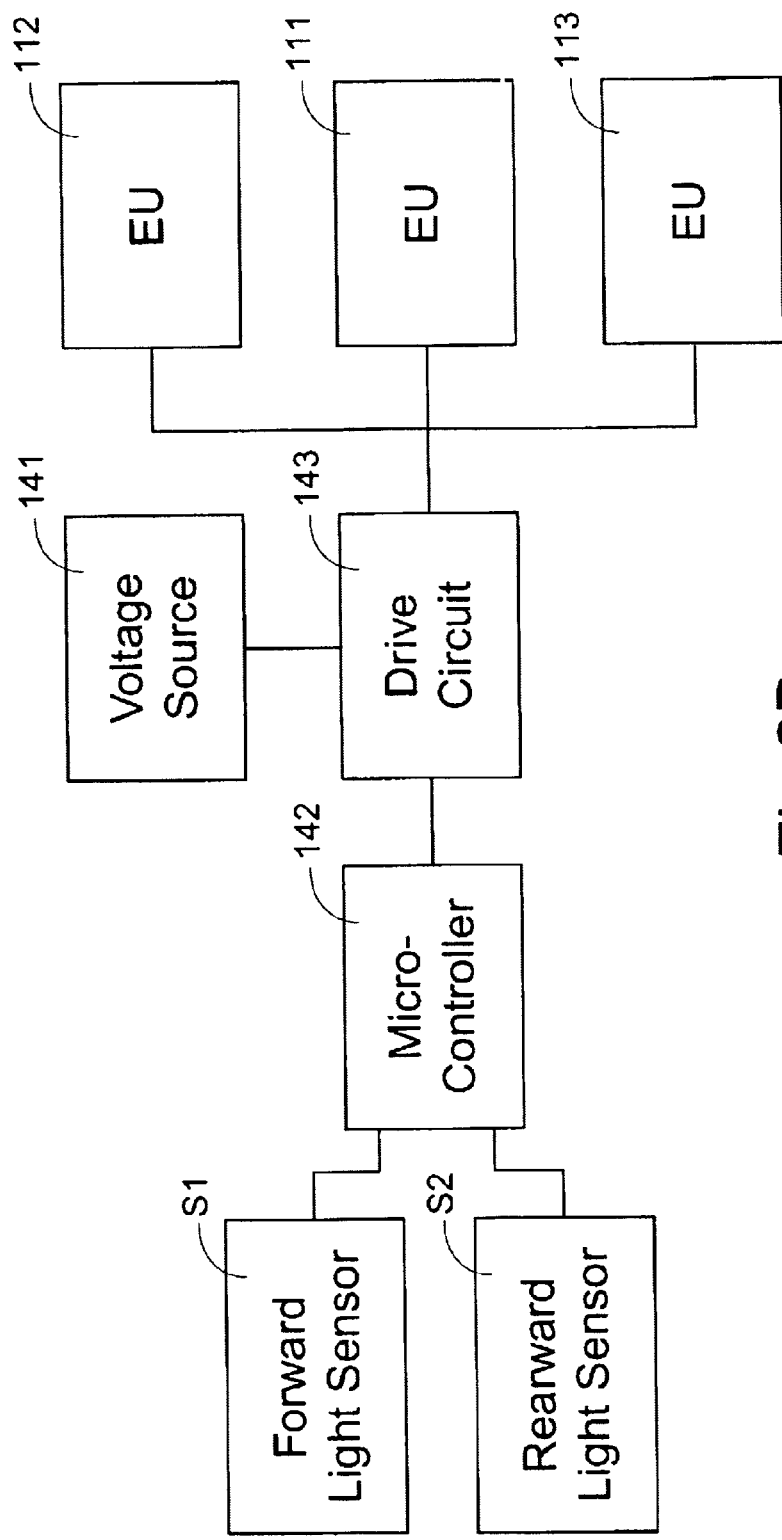
FIG. 2B is a schematic block diagram showing a control device of the electrochromic rearview mirror assembly of FIG. 2A.
Figure 3A:
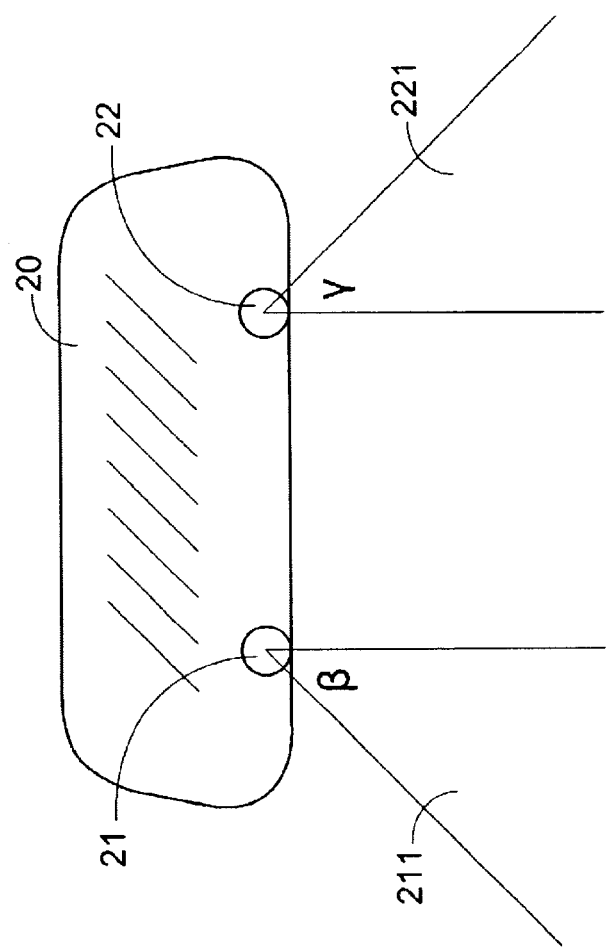
FIG. 3A is a schematic diagram showing an anti-glare rearview mirror assembly according to the present invention.
Figure 3B:
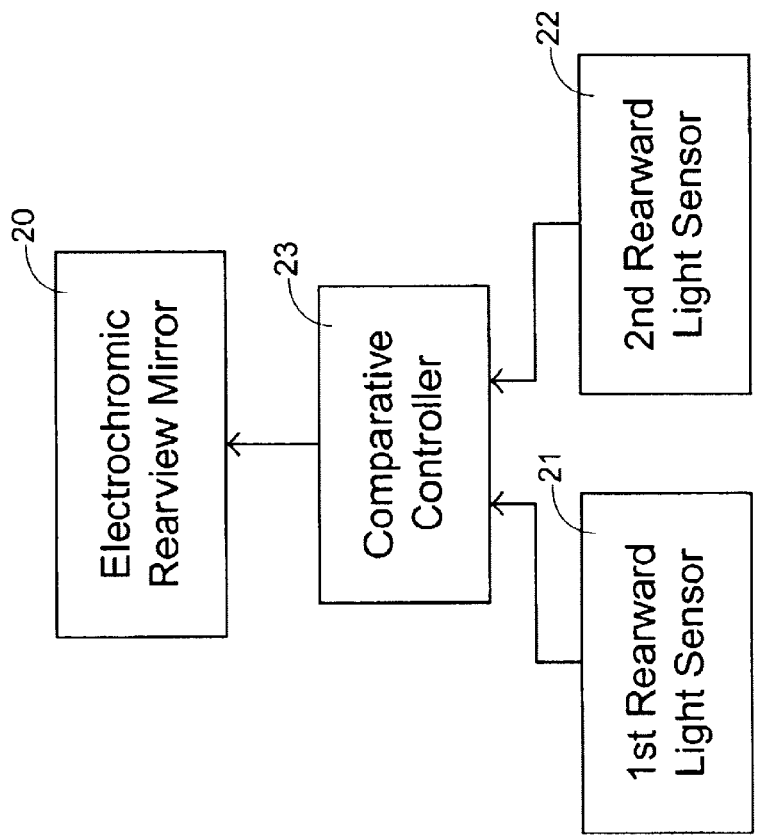
FIG. 3B is a schematic circuit block diagram of the anti-glare rearview mirror assembly of FIG. 3A.

Please refer to FIGS. 3A and 3B, which illustrate an anti-glare rearview mirror assembly according to the present invention. The anti-glare rearview mirror assembly includes an electrochromic mirror 20, a first rearward light sensor 21, a second rearward light sensor 22 and a comparative controller 23. The rearward light sensors 21 and 22 are disposed on the same side of the mirror 20, but oriented different directions so as to have detecting ranges β and γ, respectively. It is apparent that the detection ranges are enlarged, compared to the prior art. For example, as shown in FIG. 3A, the two sensors 21 and 22 are arranged symmetrically on the mirror face, and oriented the right rear side and the left rear side, respectively. Of course, in practice, the sensors are preferably oriented directions where can receive oncoming glare and will not be blocked by the driver and/or the passenger at the front seat.

Further, the forward light sensor used in the prior art can be omitted in the present invention. The comparing result of the two rearward light sensors 21 and 22 is provided for the electrochromic rearview mirror 20 for reflectance adjustment, which will be described hereinafter with reference to FIG. 4. The light intensities detected by the sensors 21 and 22 are compared in the comparative controller 23 to obtain a comparing result. For example, the comparing result is an absolute value of the light intensity difference. If the difference is smaller than a threshold or even zero, a normal condition under uniform ambient light dispersion is indicated. The comparative controller 23 will not assert any control signal to the electrochromic mirror 20. In other words, the color change will not be performed and the reflectance keeps unchanged. On the other hand, if the light intensity difference is larger than a threshold, it is determined a glare situation occurs at the side where the sensor 21 or 22 receives more intense light. Since the reflectance of the mirror 20 is preferably reduced under this circumstance, the comparative controller 23 asserts a control signal to the electrochromic rearview mirror to deepen the color of the mirror, so as to adjust the reflectance. The control signal can also be used to control the reflectance change of another monitor device in addition to the rearview mirror. For example, a liquid crystal display mounted in the car can change the reflectance parameters thereof in response to the control signal in order to have a better viewing effect.

Figure 5:
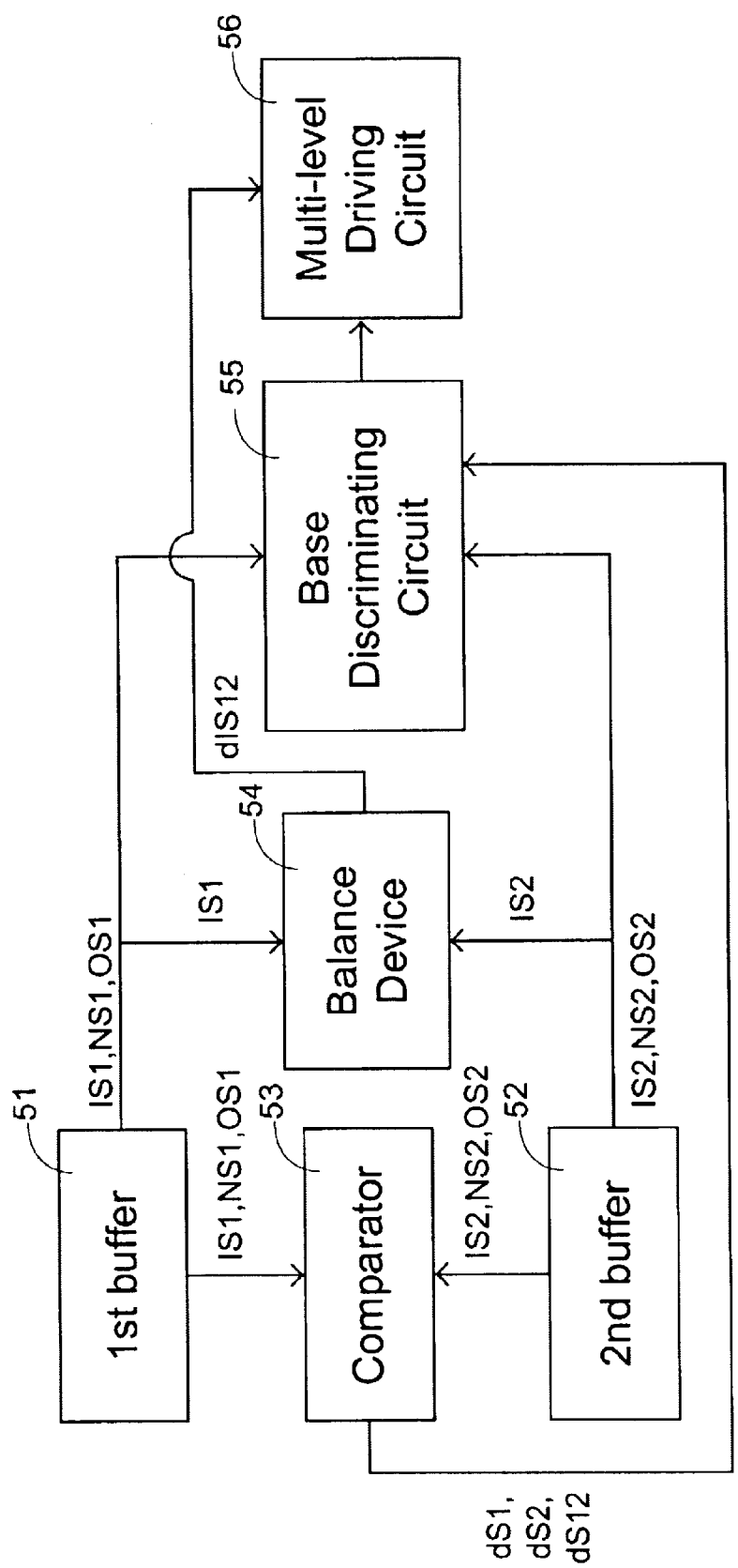
FIG. 5 is a schematic circuit block diagram showing an embodiment of the comparative controller of FIG. 3B.

Hereinafter, a preferred embodiment is illustrated with reference to FIGS. 3 and 5. FIG. 5 is a schematic circuit block diagram showing an embodiment of the comparative controller 23 of FIG. 3B. The comparative controller 23 includes a first buffer 51, a second buffer 52, a comparator 53, a balance device 54, a base discriminating circuit 55 and a multi-level driving circuit 56. When the vehicle equipped with the anti-glare rearview mirror assembly of the present invention is started, a calibration operation of the sensors 21 and 22 of the rearview mirror assembly is automatically initialized. Meanwhile, ambient light intensities IS1 and IS2 are detected by the two sensors 21 and 22, respectively. The detected initial light intensities IS1 and IS2 are transmitted to the balance device 54 of the comparative controller 23 via the first buffer 51 and the second buffer 52, respectively, to obtain a difference value dIS12=IS1−IS2. The value dIS12 is indicative of a photoelectric response error, and provided for the reference of the multi-level driving circuit 56. Afterwards, an operation mode is entered.

In the operation mode, the sensors 21 and 22 detect light intensities at a predetermined interval. For example, the sensors 21 and 22 output intensity values OS1 and OS2 in response to light intensities detected at a time point, and then output intensity values NS1 and NS2 in response to light intensities detected at the next time point. The previously obtained values OS1 and OS2 and the subsequent obtained values NS1 and NS2 are transmitted to the comparator 53 via respective buffers 51 and 52 to obtain difference values dS1 and dS2 which are indicative of light variations during a unit time, where $dS1=|OS1-NS1|$; and $dS2=|OS2-NS2|$.

Moreover, another difference value dS12, which indicates the difference between two detected values NS1 and NS2 at the same time point, is obtained. The values OS1, OS2, NS1, NS2, dS1, dS2 and dS12 are transmitted to the base discriminating circuit 55 to be operated. Then, the multi-level driving circuit 56 performs a multi-level output according to the outputs of the balance device 54 and the base discriminating circuit 55.

Figure 4:
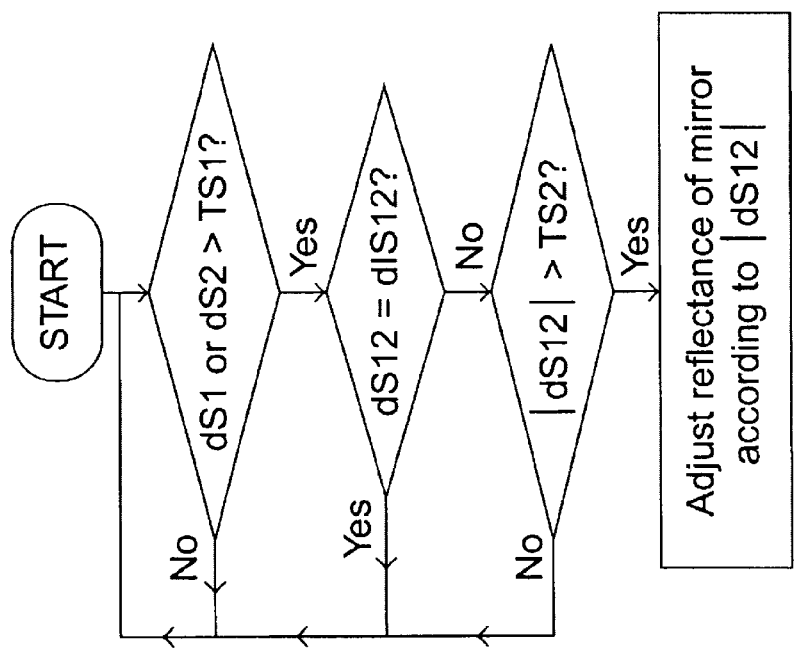
FIG. 4 is a flowchart illustrating a reflectance control method of an anti-glare rearview mirror assembly according to an embodiment of the present invention.

The reflectance control method of the above embodiment of anti-glare rearview mirror assembly is referred to FIG. 4.

First of all, the light variations dS1 and dS2 are compared with a predetermined value TS1. If either of the values dS1 and dS2 is greater than the predetermined value TS1, it means a large intensity variation is rendered, and there might be a glare situation. Subsequently, the difference value dS12 at the moment is compared with the photoelectric response error dIS12. If the comparing result indicates the substantial equality of the values dS12 and dIS12, the large intensity variation indicated by the values dS1 and dS2 will be contributed to the ambient change rather than glare effect. For example, when the car is being driven out of a garage, the values dS1 and dS2 will become large for suddenly receiving sunlight. The difference between the values dS12 and dIS12, however, will be substantially equal because both sides receive the same sudden sunlight. Once the difference value dS12 is not consistent with the photoelectric response error dIS12, the variation degree of the value dS12 is further determined by comparing the absolute value of dS12 with a threshold value TS2. When the difference value dS12 is greater than the threshold value TS2, it is determined that a glare situation occurs, and the reflectance of the mirror 20 is adjusted according to the variation degree, i.e. |dS12|.

It is understood that the same predetermined value TS1 is used for judging both of the light intensity variation levels dS1 and dS2 in the above embodiment. Alternatively, two different predetermined values can also be employed according to respective features of the sensors. For example, if dS1>TS1 or dS2>TS1', dS12 and dIS12 are compared. Further, whether the large light intensity variation results from ambient change is determined according to a comparing result of dS12 and dIS12. In the above embodiment, the ambient change is determined by a difference value "0" between dS12 and dIS12. Alternatively, a reasonable small range can be provided for the judgment. For example, the ambient change is determined when there is small difference between the values dS12 and dIS12, e.g. less than a non-zero but small threshold value.

Preferably, the present reflectance control method further determines a day/night status. If the current detected light intensities NS1 and NS2 are both greater than respective thresholds or a common threshold, it is determined to be daytime. The electrochromic operation is preferably disabled in order to save power and prolong the life span of the electrochromic cell even if a glare situation is determined. On the other hand, if at least one of NS1 and NS2 is equal to or smaller than the threshold value, it may be in the nighttime but still possibly be in the daytime when passing under a viaduct. Therefore, a double check is preferably made by comparing NS1 and NS2 with the threshold value again. Of course, it is also feasible to have the anti-glare function enabled no matter what time it is when one of the newly detected light intensities NS1' and NS2' is greater than and the other is less than the threshold value.

In the above embodiment, the light sensors 21 and 22 are mounted on the interior electrochromic rearview mirror 20 to control the color change of the interior mirror 20. Likewise, two similar light sensors may be mounted on an exterior electrochromic rearview mirror to control the color change of the exterior mirror, as shown in FIG. 6A. When the light sensors 21 and 22 are mounted on the interior electrochromic rearview mirror 20, and the glare situation occurs, which one of the light sensors 21 and 22 receives larger intensity of light is preferably determined. It is understood that the side where the light sensor receives larger intensity of light suffers from more serious glare effect. Therefore, one of the exterior rearview mirrors located at the same side as that light sensor preferably changes color thereof along with the interior rearview mirror.

Figure 6C:
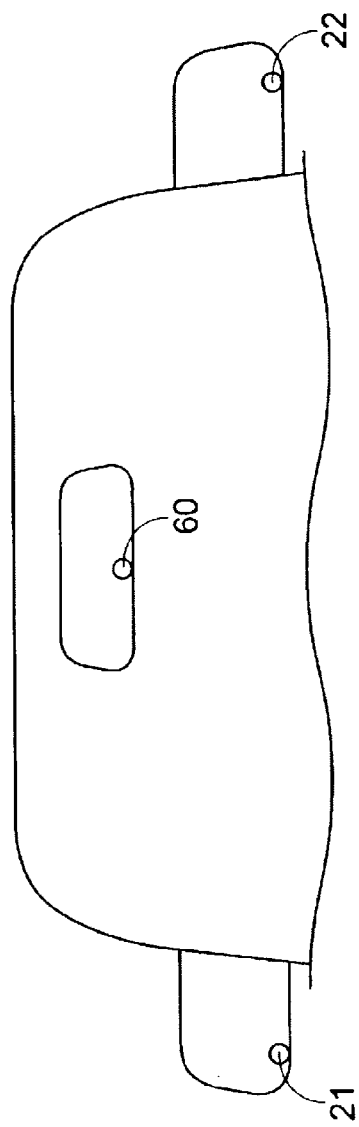
Figure 6D:
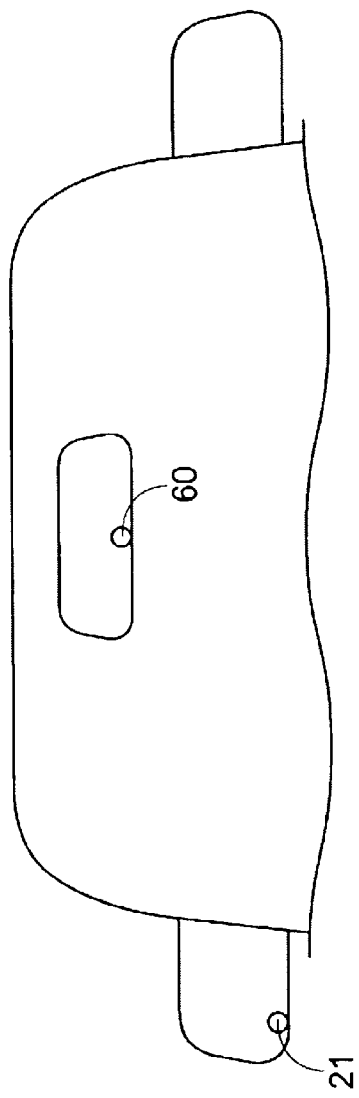

Alternatively, the two light sensors 21 and 22 can be arranged on two different rearview mirrors, as shown in FIGS. 6B or 6D, to control the color change of a part or all of the rearview mirrors. For example, in FIG. 6B, if it is the light sensor 22 detects a glare, the right-side exterior rearview mirror where the light sensor 22 is mounted performs color change. Alternatively, it can also have both of the interior and the right-side exterior rearview mirrors change colors.

Of course, in view of the above description of the present invention, more than two light sensors, e.g. sensors 21, 22 and 60 in FIG. 6C, can be used to obtain up to three sets of comparing mechanism, thereby controlling the color change of a part or all of the rearview mirrors. The electrochromic operation with reference to three light sensors will be described hereinafter.

Figure 7:
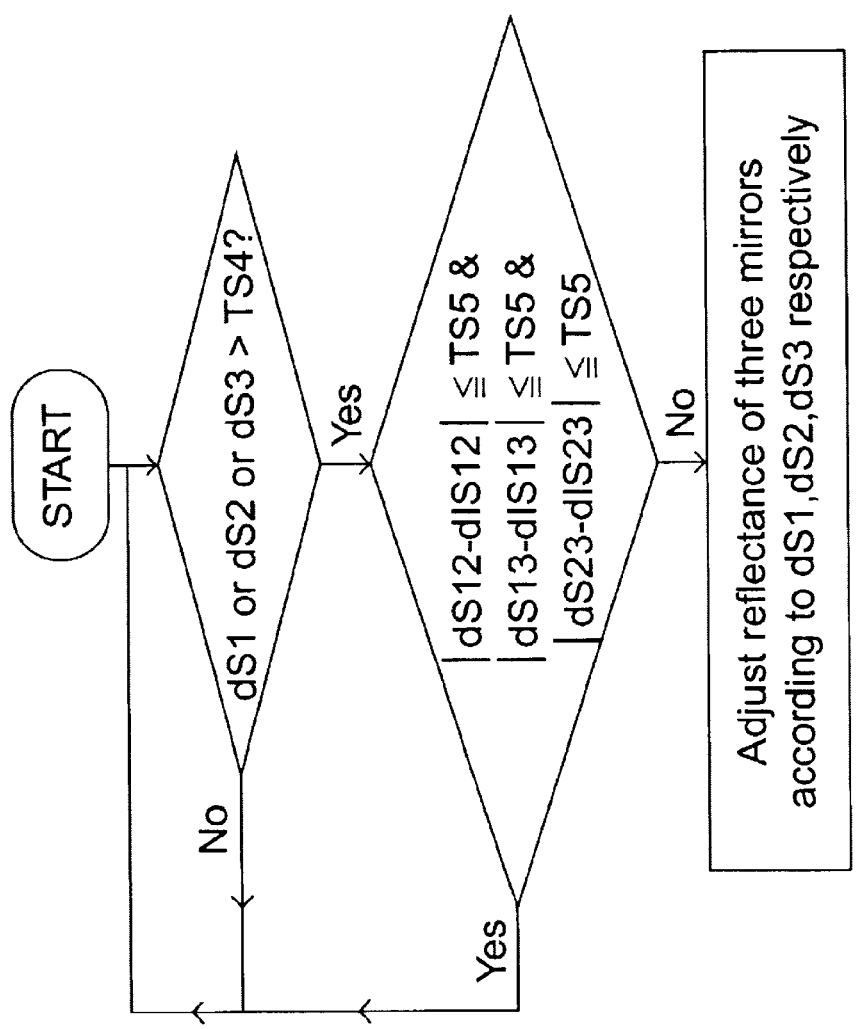
FIG. 7 is a flowchart illustrating a reflectance control method anti-glare rearview mirror assembly according to another embodiment of the present invention.

Please refer to the flowchart of FIG. 7. First of all, initial light intensities IS1, IS2 and IS3 are detected by the three sensors 21, 60 and 22, respectively. The detected light intensities IS1, IS2 and IS3 are compared to obtain photoelectric response errors dIS1, dIS2 and dIS3 between every two light sensors,
where $dIS12=|IS1-IS2|$;

$dIS13=|IS1-IS3|$; and $dIS23=|IS2-IS3|$.

Afterwards, an operation mode is entered. The sensors 21, 60 and 22 detect light intensities at a predetermined interval. For example, the sensors 21, 60 and 22 output intensity values OS1, OS2 and OS3 in response to light intensities detected at a time point, and then output intensity values NS1, NS2 and NS3 in response to light intensities detected at the next time point. The previously obtained values OS1, OS2 and OS3 and the subsequent obtained values NS1, NS2 and NS3 are compared to obtain difference values dS1, dS2 and dS3 which are indicative of light variations during a unit time,
where $dS1=|OS1-NS1|$;

$dS2=|OS2-NS2|$; and $dS3=|OS3-NS3|$.

Further, other difference values dS12, dS13 and dS23, which indicates the differences between every two detected values NS1, NS2 and NS3 at the same time point, are obtained, where $$dS12=|NS1-NS2|;$$

$$dS13=|NS1-NS3|; \text{ and}$$

$$dS23=|NS2-NS3|.$$

The light variations dS1, dS2 and dS3 are compared with a predetermined value TS4. If any of the values dS1, dS2 and dS3 is greater than the predetermined value TS4, it means a large intensity variation is rendered, and there might be a glare situation. Subsequently, the difference values dS12, dS13 and dS23 at the moment are compared with the photoelectric response errors dIS12, dIS13 and dIS23. If the comparing results indicates small differences within a tolerable range, e.g. |dS12−dIS12|≦TS5, |dS13−dIS13|≦TS5, and |dS23−dIS23|≦TS5, the large intensity variation indicated by the values dS1, dS2 and dS3 will be contributed to the ambient change rather than glare effect. Once any of the differences are beyond the tolerable range, a glare situation is determined. Meanwhile, the light variation levels dS1, dS2 and dS3 are referred to adjust the reflectances of respective mirrors.

For optimally offsetting the glare effect, the color of the mirrors are preferably changed according to respective glare levels. Assuming the above comparing results indicate a glare situation occurs, if dS1>TS4, dS2>TS4, but dS3<TS4, then only the left-side exterior and the interior rearview mirrors where the light sensors 21 and 60 are mounted change their colors, and the color of the right-side exterior rearview mirror keeps unchanged. Further, if dS2>dS1>TS4, then the reflectance of the interior rearview mirror is reduced to a larger extent than the left-side rearview mirror.

In a further embodiment, three or four light sensors may be mounted on the two or three rearview mirrors of the vehicle, as shown in FIGS. 6E or 6F. The above-mentioned two-sensor or three-sensor detecting and adjusting mode can be selectively applied to this embodiment.

Further, the comparing operations mentioned above are subtracting operations. Alternatively, dividing operations can be applied to obtain ratio values provided for the above discriminating procedures.

The comparative controller according to the present invention can be integrated into the computer system of the vehicle, and receives and transmits signals via a traditional communication network system or a vehicular digital bus such as a controller area network bus (CAN-bus) or a vehicle area network bus (VAN-bus) system of a vehicle. Alternatively, it can be a control module added to an existent computer system of the vehicle especially via a CAN-bus or a VAN-bus system. The CAN-bus or VAN-bus system is a communication standard for vehicles to communicate local computers with one another. Due to the arrangement of local computers or control modules, the numerous and complicated cables of various equipment of the vehicle are localized and simplified, and all the signals are transmitted among computers or control modules via the CAN-bus or VAN-bus system. Consequently, the overall length and weight of the cables are significantly reduced. The local computers can be in communication with the CAN bus or VAN bus via connecting cables or wireless transmission.

Figure 8:
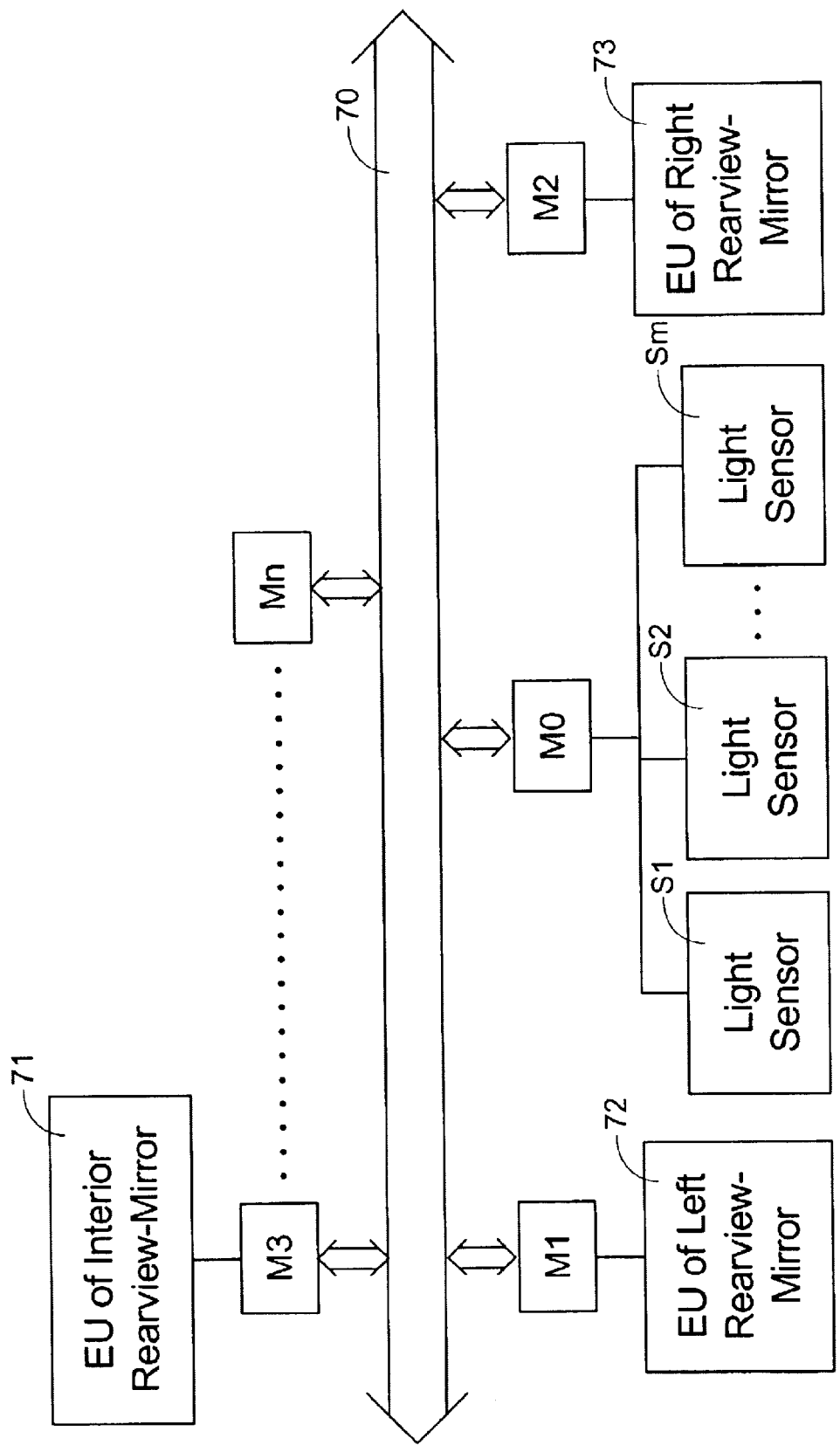
FIG. 8 is a schematic diagram showing the transmission of signal between a control module according to an embodiment of the present invention and rearview mirrors to be manipulated via a CAN-bus system.

FIG. 8 schematically shows the transmission of signals between a control module including the comparative controller of the present invention and rearview mirrors to be manipulated via a CAN-bus system. The present control module M0 is electrically connected between the CAN bus 70 and the rearward light sensors S1~Sm required to determine whether the reflectance of the rearview mirrors is to be adjusted or not. The control module M0 receives the outputs of the light sensors, and transmits out a digital encoding signal to the CAN bus 70 to inform of a glare situation. Meanwhile, all the local computers or control modules M1 . . . Mn can acquire the information via the CAN bus. The digital encoding signal includes an ID code and a command code. The ID code directs to one or two or three of the control modules M1, M2 and M3, so it is only the relevant control module(s) will respond to the digital encoding signal. The command code corresponds to a message for triggering the relevant rearview-mirror electrochromic unit(s) 71, 72 and/or 73 to change the color of the rearview mirror(s).

Figure 9:
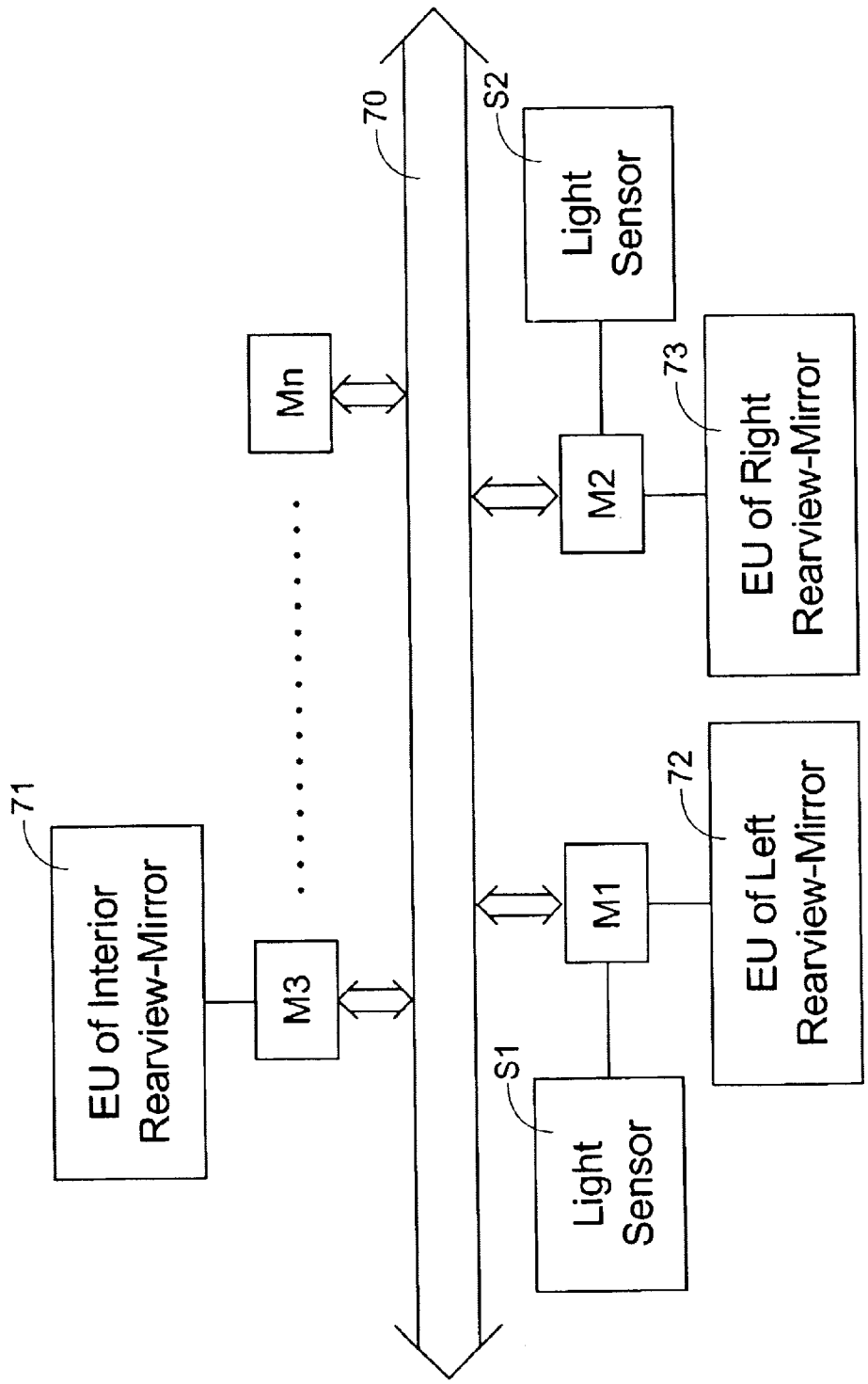
FIG. 9 is a schematic diagram showing the transmission of signal among control modules according to another embodiment of the present invention and rearview mirrors to be manipulated via a CAN-bus system.

Alternatively, the light sensors can be connected to different control modules if they are far away from each other. The control modules can be existent ones. For example, as shown in FIG. 9, two light sensors disposed on two rearview mirrors, respectively, are connected to the control modules for controlling the two rearview mirrors.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A monitoring assembly for use in a vehicle, comprising:
   a monitor device changing the reflectance thereof in response to a control signal;
   a first light sensor for receiving a first light from a first specified range, and outputting a first signal in response to the intensity of said first light;
   a second light sensor for receiving a second light from a second specified range partially overlapping with said first specified range, and outputting a second signal in response to the intensity of said second light; and
   a comparative controller in communication with said first light sensor and said second light sensor, receiving and operating said first signal and said second signals to obtain a first result, and asserting said control signal to adjust the reflectance of said monitor device according to said first result, wherein said comparative controller includes a comparator receiving said first signal and said second signal, comparing said first signal at a first time point and said first signal at a second time point to obtain a first light variation, comparing said second signal at said first time point and said second signal at said second time point to obtain a second light variation, and further comparing said first signal and said second signal at said second time point to obtain a light difference on a condition that said first light variation or said second light variation exceeds a first threshold value.

2. The monitoring assembly according to claim 1 wherein said monitor device is an electrochromic rearview mirror.

3. The monitoring assembly according to claim 2 wherein said first light sensor and said second light sensors are both mounted on said electrochromic rearview mirror facing inside the vehicle.

4. The monitoring assembly according to claim 2 wherein said comparative controller includes
   a base discriminating circuit in communication with said comparator, comparing said light difference with a second threshold value to obtain said first result.

5. The monitoring assembly according to claim 4 wherein said comparative controller further includes:
   a balance device receiving and comparing said first signal and said second signal in an initial mode to obtain a photoelectric response error; and
   a multi-level driving circuit in communication with said base discriminating circuit and said balance device, differentially adjusting the reflectance of said electrochromic rearview mirror according to said first result and said photoelectric response error.

6. The monitoring assembly according to claim 5 wherein said multi-level driving circuit adjusts the reflectance of said electrochromic rearview mirror when said light difference is substantially unequal to said photoelectric response error, and said first result indicates the light difference is greater than said second threshold value.

7. The monitoring assembly according to claim 2 wherein said first light sensor and second light sensors are arranged on two corners of said electrochromic rearview mirror.

8. The monitoring assembly according to claim 2 wherein said electrochromic rearview mirror is selected from an interior rearview mirror, an exterior rearview mirror, and a combined interior and exterior mirror set.

9. The monitoring assembly according to claim 1 wherein said monitor device is a display.

10. The monitoring assembly according to claim 9 wherein said monitor device is a liquid crystal display.

11. An anti-glare rearview mirror assembly for use in a vehicle, comprising:
   a first electrochromic rearview mirror changing the reflectance thereof in response to a first control signal;
   a second electrochromic rearview mirror changing the reflectance thereof in response to a second control signal;
   a first rearward light sensor disposed on said first electrochromic rearview mirror for receiving a first light, and outputting a first signal in response to the intensity of said first light;
   a second light sensor disposed on said second electrochromic rearview mirror for receiving a second light, and outputting a second signal in response to the intensity of said second light; and
   a comparative controller in communication with said first light sensor and said second light sensor, receiving and operating said first signal and said second signal to obtain a first result, and asserting either of said first control signal and said second control signal to adjust the reflectance of a corresponding one of said first electrochromic rearview mirror and said second electrochromic rearview mirror according to said first result, wherein said comparative controller includes a comparator receiving said first signal and said second signal, comparing said first signal at a first time point and said first signal at a second time point to obtain a first light variation, comparing said second signal at said first time point and said second signal at said second time point to obtain a second light variation, and further comparing said first signal and said second signal at said second time point to obtain a light difference on a condition that said first light variation or said second light variation exceeds a first threshold value.

12. The anti-glare rearview mirror assembly according to claim 11 wherein said first electrochromic rearview mirror and said second electrochromic rearview mirror are an interior and an exterior rearview mirrors changing colors thereof in response to said first control signal and said second control signal, respectively.

13. The anti-glare rearview mirror assembly according to claim 11 wherein said first electrochromic rearview mirror and second electrochromic rearview mirror are two exterior rearview mirrors changing colors thereof in response to said first control signal and said second control signal, respectively.

14. The anti-glare rearview mirror assembly according to claim 11 wherein said comparative controller includes
   a base discriminating circuit in communication with said comparator, comparing said light difference with a second threshold value to obtain said first result.

15. The anti-glare rearview mirror assembly according to claim 11 wherein said comparative controller further includes:
   a balance device receiving and comparing said first signal and said second signal in an initial mode to obtain a photoelectric response error; and
   a multi-level driving circuit in communication with said base discriminating circuit and said balance device, differentially adjusting the reflectance of said electrochromic rearview mirror according to said first result and said photoelectric response error.

16. The anti-glare rearview mirror assembly according to claim 15 wherein said multi-level driving circuit adjusts the reflectance of said electrochromic rearview mirror when said light difference is substantially unequal to said photoelectric response error, and said first result indicates the light difference is greater than said second threshold value.

17. The anti-glare rearview mirror assembly according to claim 11 further comprising a third sensor disposed on said first electrochromic rearview mirror for receiving a third light, and outputting a third signal in response to the intensity of said third light.

18. The anti-glare rearview mirror assembly according to claim 17 further comprising:
   a third electrochromic rearview mirror changing the reflectance thereof in response to a third control signal; and
   a fourth sensor disposed on said third electrochromic rearview mirror of said vehicle for receiving a fourth light, and outputting a fourth signal in response to the intensity of said fourth light.

19. The anti-glare rearview mirror assembly according to claim 11 further comprising:
   a third electrochromic rearview mirror changing the reflectance thereof in response to a third control signal; and
   a third sensor disposed on said third electrochromic rearview mirror of said vehicle for receiving a third light, and outputting a third signal in response to the intensity of said third light.

20. A reflectance control method of a monitoring assembly, comprising steps of:
   receiving a first rearward light from a first specified region and a second rearward light from a second specified region at a first time point;
   receiving a third rearward light from said first specified region and a fourth rearward light from said second specified region at a second time point preceding said first time point;
   comparing intensities of said first rearward light and said third rearward light to obtain a first light variation;
   comparing intensities of said second rearward light and said fourth rearward light to obtain a second light variation;

comparing said first light variation and said second light variation with a first threshold value;

comparing intensities of said first rearward light and said second rearward light to obtain a light difference therebetween; and adjusting the reflectance of a monitor device according to said light difference on a condition that said first light and/or said second light variation exceeds said first threshold value.

21. The method according to claim 20 further comprising a step of comparing said light difference with a photoelectric response error, and disabling said step of adjusting the reflectance of said monitor device when a difference of said light difference and said photoelectric response error is within a predetermined range.

22. The method according to claim 20 further comprising a step of comparing said intensities of said first rearward light and said second rearward light with a threshold value, and disabling said step of adjusting the reflectance of said monitor device when both of said intensities of said first rearward light and said second rearward lights are greater than said threshold value.

23. The method according to claim 20 wherein said step of adjusting the reflectance of said monitor device is performed on a condition that said light difference exceeds a second threshold value.

24. The method according to claim 20 wherein said monitor device is a liquid crystal display.

25. The method according to claim 20 wherein said monitor device is an anti-glare rearview mirror.

26. The method according to claim 25 wherein said monitor device includes an interior rearview mirror arranged inside a vehicle and two exterior rearview mirrors respectively arranged by two sides of said vehicle, and said anti-glare rearview mirror is said interior rearview mirror.

27. The method according to claim 26 further comprising a step of determining which one of said first rearward light and said second rearward light is larger, and further adjusting the reflectance of one of said exterior rearview mirrors, which is closer to said rearward light with larger intensity than to said rearward light with smaller intensity.

28. A reflectance control method of an anti-glare rearview mirror assembly, said anti-glare rearview mirror assembly comprising of a first rearview mirror, a second rearview mirror and a third rearview mirror, and said stepmethod comprising the steps of:

mounting a first light sensor, a second light sensor and a third light sensor on said first rearview mirror, said second rearview mirror and said third rearview mirror, respectively;

receiving a first rearward light, a second rearward light, and a third rearward light at a first time point;

receiving a fourth rearward light, a fifth rearward light, and a sixth rearward light at a second time point following said first time point;

comparing intensities of said first rearward light, said second rearward light and said third rearward light with said fourth rearward light, said fifth rearward light and said sixth rearward light, respectively, to obtain a first light difference, a second light difference and a third light difference;

comparing said first light difference, said second light difference and said third light difference with a threshold value; and adjusting the reflectance of any of said first rearview mirror, said second rearview mirror and said third rearview mirror having said light difference thereof greater than said threshold value.

29. The method according to claim 28 wherein said step of adjusting reflectance is performed according to levels of said light differences.

* * * * *